June 15, 1926.

G. P. BULL

CASTER

Filed Sept. 3, 1925

1,589,104

INVENTOR
George P. Bull
BY
ATTORNEY

Patented June 15, 1926.

1,589,104

UNITED STATES PATENT OFFICE.

GEORGE P. BULL, OF SAN JOSE, CALIFORNIA.

CASTER.

Application filed September 3, 1925. Serial No. 54,256.

It is one object of the invention to provide a caster that may be readily adapted for use on vehicles as well as upon furniture and other movable objects.

It is another object of the invention to provide a caster of the character indicated that can be reversed in the direction of its movement with a minimum amount of friction and that will, therefore, readily respond to a change in the direction of movement of the body carried thereby.

In the drawing:—

Figures 1, 2, 3:
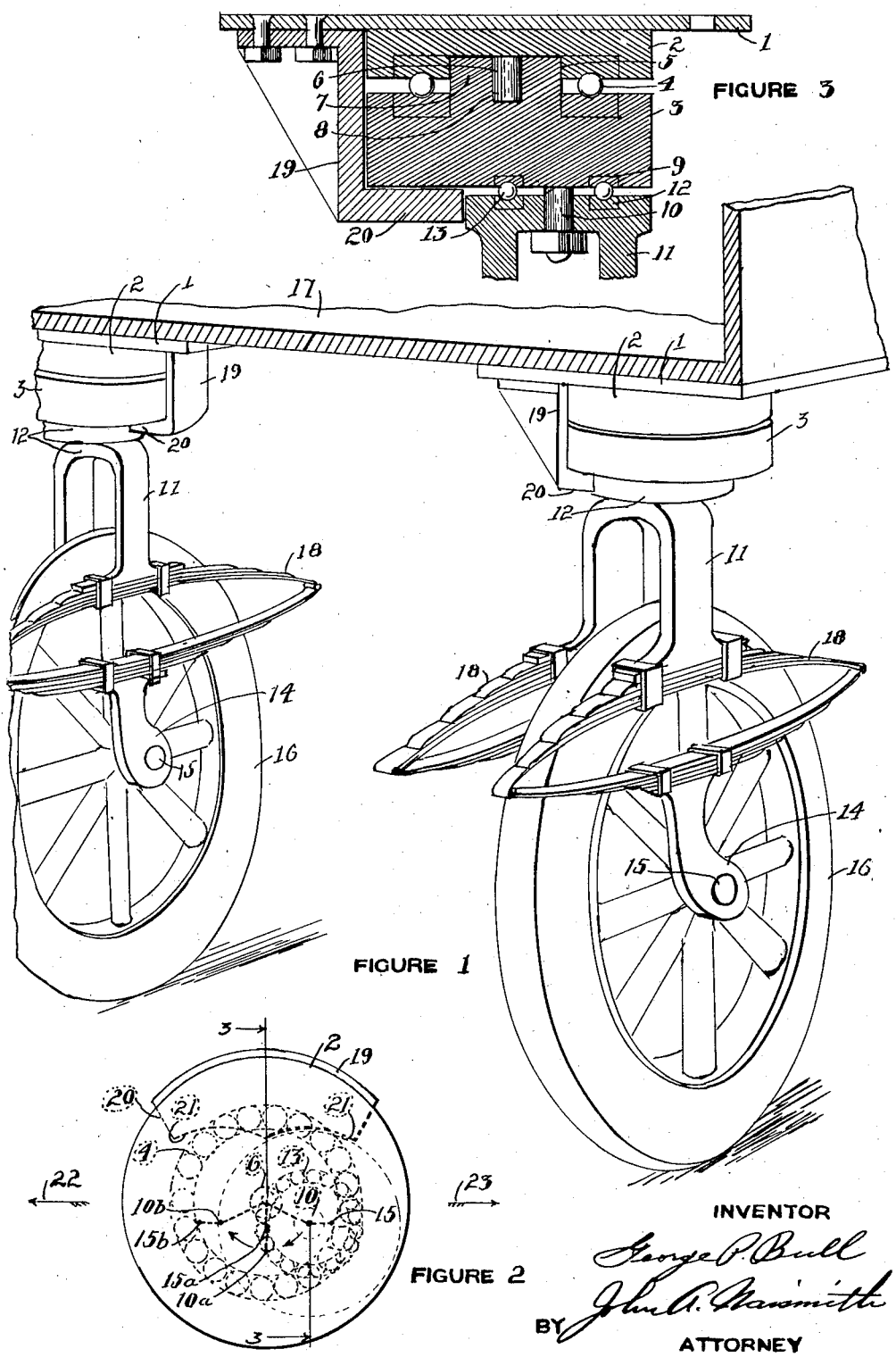
Figure 1 is a perspective view of a caster as applied to a trailer vehicle.
Figure 2 is a plan view of a caster embodying my invention and illustrating its mode of operation.
Figure 3 is a section on line 3—3 of Figure 2.

Referring more particularly to the drawing, I show at 1 a plate mountable upon the under side of a vehicle or movable body in any suitable manner and having one plate as 2 of a ball bearing mounted thereon as an integral part thereof, the other plate being shown at 3 and the balls at 4.

Plate 2 has a concentrically arranged annular recess 5 formed therein and carries a central depending pivot 6, while plate 3 is provided with an annular boss 7 and socket 8 to engage the recess 5 and pivot 6 of plate 2.

Eccentrically mounted on the bottom of plate 3 is the upper plate 9 of a ball bearing somewhat smaller than the bearing above described and as clearly shown in Figure 3. An axially arranged pivot 10 depends from plate 9 and passes through the top of a post 11 which carries the bottom plate 12 of the bearing, the balls being shown at 13.

The post 11 has an offset lower end portion 14 through which the axle 15 of wheel 16 passes, and when the caster is used on a trailer vehicle as 17 it may be fitted with springs 18.

At 19 is shown a bracket bolted to the under side of the plate 1 and extending downwardly and under plate 2 as shown at 20 in Figure 3, this portion 20 having its inner edge formed as shown at 21—21 to engage plate 12 on post 11 and form a stop for the plate 2. This part 20 is so formed and proportioned that when the vehicle 17 is moved forwardly or backwardly the engagement of plate 12 therewith at all times holds the pivot 10 offset a distance relative to a vertical plane passing through the pivot 6 in the direction of the line of movement of the vehicle.

With the vehicle moving in the direction indicated by arrow 22 the parts normally assume the positions indicated by the several reference numerals as heretofore applied. When, however, the direction of movement of the vehicle is reversed and caused to travel in the direction indicated by arrow 23 the frictional contact of wheel 16 with the ground causes the post 11 to turn on bearings 9, 10, 12 while the plate 3 carrying bearing 9, 10, 12 also turns on the bearing 2, 3, 4, so that when the reversing movement is half completed the points 15, 10, 6 are in the relative positions 15ª, 10ª, 6ª, and when the reversing movement is completed these points are in the positions 15ᵇ, 10ᵇ, 6ᵇ.

In performing this maneuver the wheel 16 merely pivots on a substantially fixed vertical axis 24, while the pivot 10 passes by on the outer side thereof and the pivot 6 passes by on the inner side thereof.

This movement is accomplished with a minimum amount of friction and effectually eliminates excessive side thrust of the wheels 16 when the direction of movement of the vehicle is changed or reversed.

The device is also effective in turning because in making a turn the pivot wheel operates freely so that side thrust is eliminated, and the outer wheel is held in its normal position by stop 20.

It is to be understood, of course, that while I have herein shown and described one specific embodiment of the invention, changes in form, construction, and method of operation may be made within the scope of the appended claims.

I claim:

1. A device of the character described comprising a ball bearing mountable upon the under side of a horizontally movable body, a second ball bearing of less diameter than the first eccentrically mounted upon the lower side thereof and carrying a wheel supporting element having an offset lower end, a wheel journaled on said offset end, and means for limiting the rotation of said first bearing.

2. A device of the character indicated comprising a ball bearing mountable upon the under side of a horizontally movable body, a second ball bearing of less diameter than the first eccentrically mounted upon the lower side thereof and carrying a wheel supporting element having an offset lower end, a wheel journaled on said offset end, and a stop positioned to engage said second bearing whereby to maintain its axis of rotation offset with relation to the path of travel of the axis of rotation of said first bearing.

GEORGE P. BULL.